United States Patent [19]

Abel

[11] Patent Number: 5,110,461
[45] Date of Patent: May 5, 1992

[54] APPARATUS FOR SEPARATING LIQUIDS AND SOLIDS

[76] Inventor: Gunther Abel, 210-11673-7th Ave., Richmond, British Columbia, Canada, V7E 4X3

[21] Appl. No.: 577,556

[22] Filed: Sep. 5, 1990

[51] Int. Cl.⁵ .................. B01D 33/06; B01D 33/76
[52] U.S. Cl. ................... 210/158; 210/159; 210/161; 210/174; 210/184; 210/210; 210/298; 210/394; 210/415; 100/145; 100/156; 100/905; 100/907
[58] Field of Search ............... 210/158, 159, 161, 162, 210/173, 174, 184, 209, 210, 394, 396, 403, 415, 259, 262, 524, 297, 298, 308; 198/666, 668; 100/145, 146, 156, 147, 904, 905, 907

[56] References Cited

U.S. PATENT DOCUMENTS

| | | | |
|---|---|---|---|
| 1,382,056 | 6/1921 | Bontemps et al. | 210/210 |
| 2,102,570 | 12/1937 | Lind | 210/298 |
| 2,199,788 | 5/1940 | Durdin, Jr. | 210/173 |
| 2,266,937 | 12/1941 | Tark | 210/524 |
| 2,647,085 | 7/1953 | Jolman | 210/298 |
| 2,830,695 | 4/1958 | Fennimore et al. | 198/668 |
| 2,929,504 | 3/1960 | Lind et al. | 210/162 |
| 3,240,169 | 3/1966 | Cunningham | 700/145 |
| 3,865,727 | 2/1975 | Broling et al. | 210/162 |
| 4,615,801 | 10/1986 | Lee | 210/185 |
| 4,634,524 | 1/1987 | Huber | 210/158 |
| 4,836,919 | 6/1989 | Huber | 210/161 |
| 4,859,322 | 8/1989 | Huber | 210/162 |
| 5,006,236 | 4/1991 | Croket | 210/162 |

Primary Examiner—Stanley S. Silverman
Assistant Examiner—Christopher Upton

[57] ABSTRACT

Apparatus for separating liquids and solids, comprising, separator screen means for receiving and separating the solids and liquids, conveyor means for feeding the separated solids upwardly from the separator screen means, and compactor means for compacting the solids, the conveyor means comprising a first conveyor extending at a first upward inclination through the separator screen means and a second conveyor extending further upwardly and at a greater inclination than the first conveyor means.

17 Claims, 13 Drawing Sheets

APPARATUS FOR SEPARATING LIQUIDS AND SOLIDS

FIELD OF THE INVENTION

The present invention relates to apparatus for separating liquids and solids and is useful, for example, for the treatment of waste water, sludge or industrial effluents or for the separation of fruit juices from pulp, etc.

BACKGROUND OF THE INVENTION

It has previously been proposed to provide a screening system for the screening of sewage, sludges and industrial effluents which has a generally cylindrical screenings basket formed by a plurality of cylindrically curved, coaxial and axially spaced screen bars. Within the screenings basket, there is provided a trough, containing an conveyor auger, and a rake which is rotatable within the basket for raking screenings from the bars into the conveyor.

In operation of this prior art system, the cylindrical screenings basket is mounted at an inclination in a channel along which the mixture of liquid and solids flows towards the screenings basket and into an open end of the screenings basket. The inflowing liquid can then leave the basket through gaps between the cylindrically curved bars of the basket, whereas the solids are retained on these bars within the basket until they are raked by the rotating rake and thereby deposited into the trough for conveyance upwardly from the screenings basket by the conveyor auger to a compactor.

It is a disadvantage of this prior art system that, since the auger conveyor is coaxial with the cylindrical screenings basket, and since the latter must be disposed at a relatively low inclination in order to utilize the maximum area of the basket for screening, the auger must consequently be disposed at the same low angle of inclination. This prior art system is therefore bulky.

BRIEF SUMMARY OF THE INVENTION

It is accordingly an object of the present invention to provide a novel and improved apparatus for separating liquids and solids, in which, in order to save space, the solids can be removed along a path extending at a greater inclination than was possible with the above-described prior art apparatus.

According to the present invention, there is provided apparatus for separating liquids and solids which comprises a separator for removing and separating the solids and liquids, the separator means comprising a cylindrically curved screening basket, and conveyor means for feeding the separated solids upwardly from the separator. A compactor is provided for compacting the solids, and the conveyor means comprises a first conveyor extending at a first upward inclination through the separator and a second conveyor extending further upwardly, and at a greater inclination than the first conveyor means.

Preferably, the compactor is interposed between the first and second conveyors for feeding the solids in a compacted state to the second conveyor.

The apparatus may also be provided with means, for example cutter means or pelletizer means, between the compacting means and the second conveyor for reducing the compacted solids to separate, or readily conveyable pieces, to thereby facilitate conveyance of the solids by the second conveyor.

BRIEF DESCRIPTION OF THE DRAWINGS

Further objects, features and advantages of the present invention will be more readily apparent from the following description of preferred embodiments thereof given by way of example, with reference to the accompanying drawings, in which:

FIG. 3c shows a view taken in transverse cross-section along the line 3c—3c of FIG. 3a;

DESCRIPTION OF THE PREFERRED EMBODIMENTS

Figure 1:
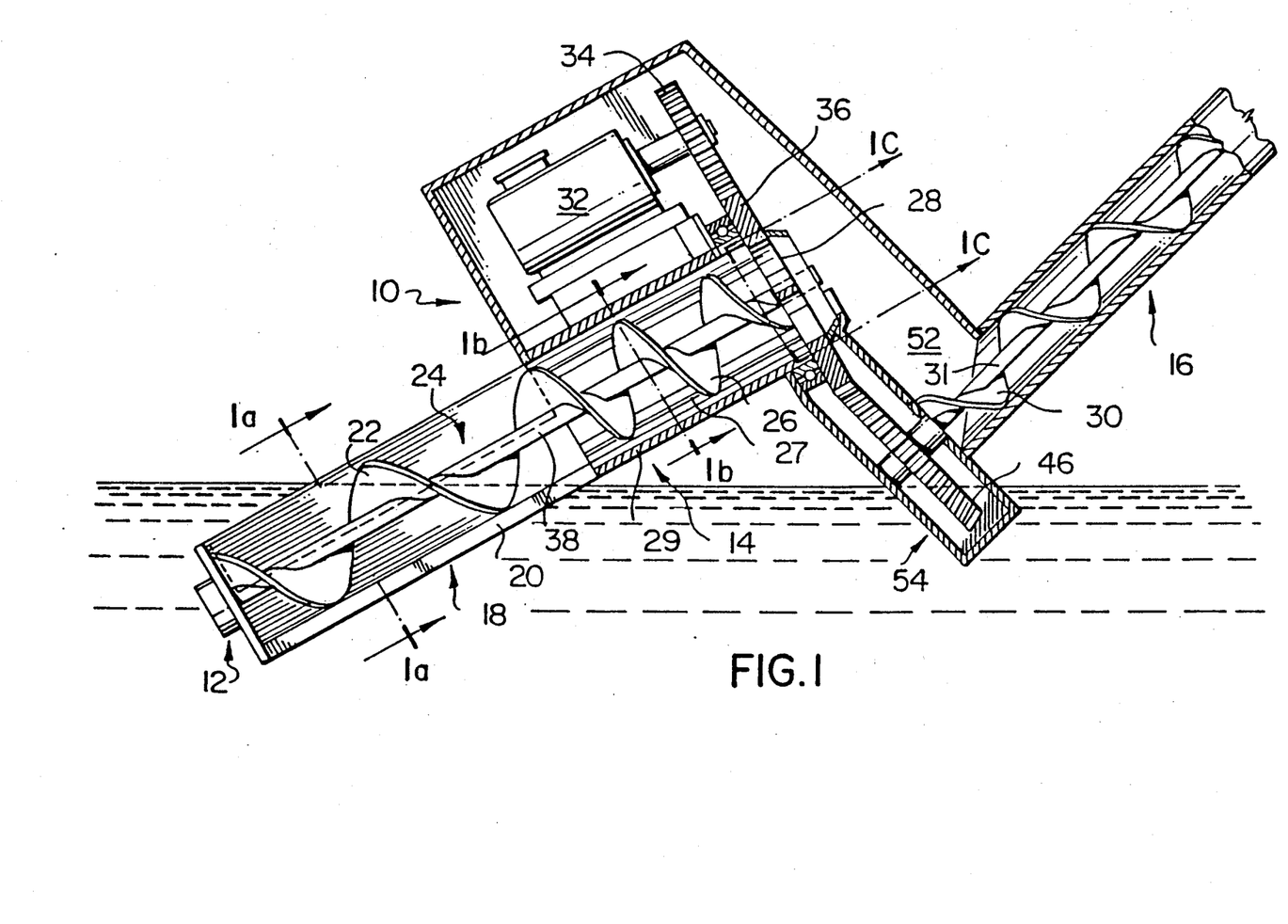
FIG. 1 shows a view taken in vertical cross-section through a screening apparatus according to a first embodiment of the present invention.
Figure 1A:
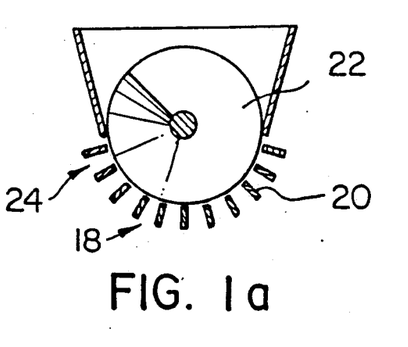
FIG. 1a shows a view taken in cross-section along the line 1a—1a of FIG. 1.
Figure 1B:
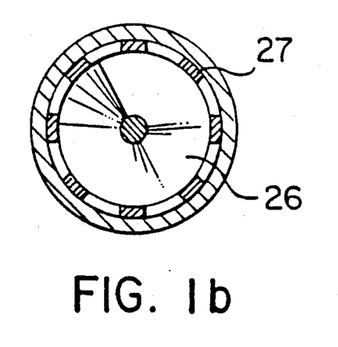
FIG. 1b shows a view taken in cross-section along the line 1b—1b of FIG. 1.
Figure 1C:
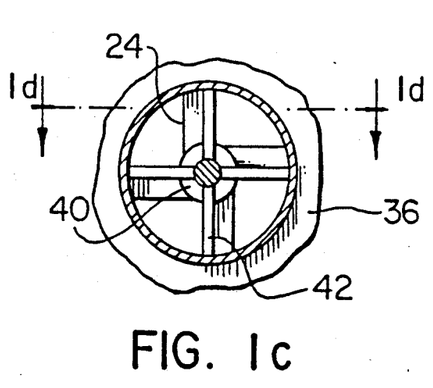
FIG. 1c shows a like taken in section along the line 1c—1c of FIG. 1.
Figure 1D:
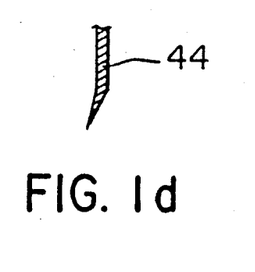
FIG. 1d shows a view taken in section along the line 1d—1d of FIG. 1c and showing a portion only of the apparatus shown in FIG. 1c.

Referring firstly to FIGS. 1 through 1d of the accompanying drawings, reference numeral 10 indicates generally a screening apparatus, which comprises a separator section indicated generally by reference numeral 12, a compactor section indicated generally by reference numeral 14 and an output conveyor section indicated generally by reference numeral 16.

The separator section 12 comprises a separator screen or basket indicated generally by reference numeral 18 (see FIG. 1a), which comprises parallel, longitudinally extending screen bars 20 arranged in a generally cylindrically curved array about the periphery of a conveyor auger 22, with the bars 20 spaced laterally apart from one another. A trough indicated generally by reference numeral 24 is upwardly open and has its bottom formed by the screen 18 and serves to receive a mixture of liquid and solids through the open top thereof.

The liquid can flow outwardly of the separator section 12 through the gaps between the bars 20, but the solids are displaced upwardly along the bars 20 by rotation of the auger 22.

The compactor section 14 has a compactor auger 26, which forms an extension of the conveyor auger 22 and which serves to compact the separate pieces of solid material advanced from the separator section 12 into a solid mass. The auger 26 rotates within longitudinal, stationery bars 27 (FIG. 1b), which allow water to escape and prevent, at least to some extent, rotation of the solid material compacted by the auger 26.

The bars 27 are mounted on the inner surface of cylinder 29 enclosing the auger 26. At the upper, outlet end of the compactor section 14, there is provided a cutter device indicated generally by reference numeral 28, by means of which the solid, compacted mass of material is sliced into pieces.

These pieces of solid material then drop from the cutter device 28 into the lower, input end of the conveyor section 16.

A second conveyor auger 30 in the conveyor section 16 then conveys these pieces of the solid material upwardly along the output conveyor section 16 for discharge into a suitable container (not shown). The lower end of the auger 30 includes a shaft 31, which extends through only two turns of the auger 30, the remainder of which has no shaft.

On the compactor section 14, there is mounted an electric drive motor 32, having an output gear 34 which meshes with a ring gear 36.

The ring gear 36 is mounted on a shaft 38, which is common to the conveyor auger 22 and the compactor auger 26. More particularly, the ring gear 36 has a hub 40 fixed to the shaft 38. The cutter device 28 comprises four arms 42 connecting the ring gear 36 to the hub 40 and each provided with a cutter blade 44, as shown in FIGS. 1c and 1d. The arrangement is such that, as the compacted mass of solid materials is forced through the spaces between the arms 42 by the compactor auger 26, the cutter blades 44 slice this material, which is thus broken into separate pieces. These separate pieces of solid material then drop downwardly to the second conveyor section 16.

The auger 30 of the output conveyor section 16 is driven by means of a gear 46, which is mounted on the shaft 31 of the conveyor auger 30 and which meshes with the ring gear 36 so as to be driven thereby.

The motor 32 and the gears 34 and 36 are enclosed in a housing indicated generally by reference numeral 50.

This housing defines an outlet chute 52 extending downwardly from the cutter device 34 to the inlet end of the output conveyor section 16 for guiding the sliced pieces of solid material to the latter. The gear 46 is enclosed in a separate housing indicated generally by reference numeral 54.

Figure 1E:
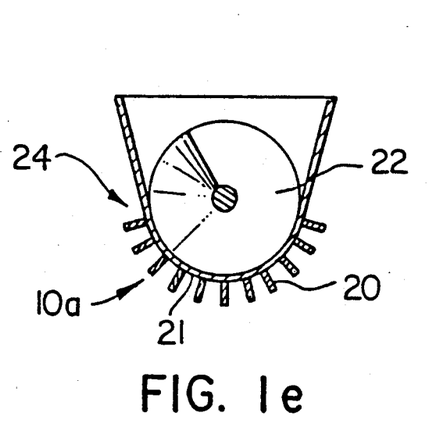
FIG. 1e shows a view corresponding to FIG. 1a but taken in cross-section through a modification of the apparatus of FIG. 1.

FIG. 1e shows a separator screen or basket indicated generally by reference numeral 18a, which is identical to that shown in FIG. 1a in that the screen 18a is formed by the bars 20 and the trough 24. In addition, however, the screen 18a of FIG. 1e is provided with a microscreen 21 at the interior of the array of bars 20 and between the latter and the auger 22. This microscreen 21 may be made of metal or fabric mesh, perforated sheet metal, woven fabric or woven or mesh plastics material and is useful, in particular, in applications which require relatively small pieces of solid material to be conveyed upwardly by the auger 22 rather than being discharged through the bars 20 with the escaping water.

Figure 2:
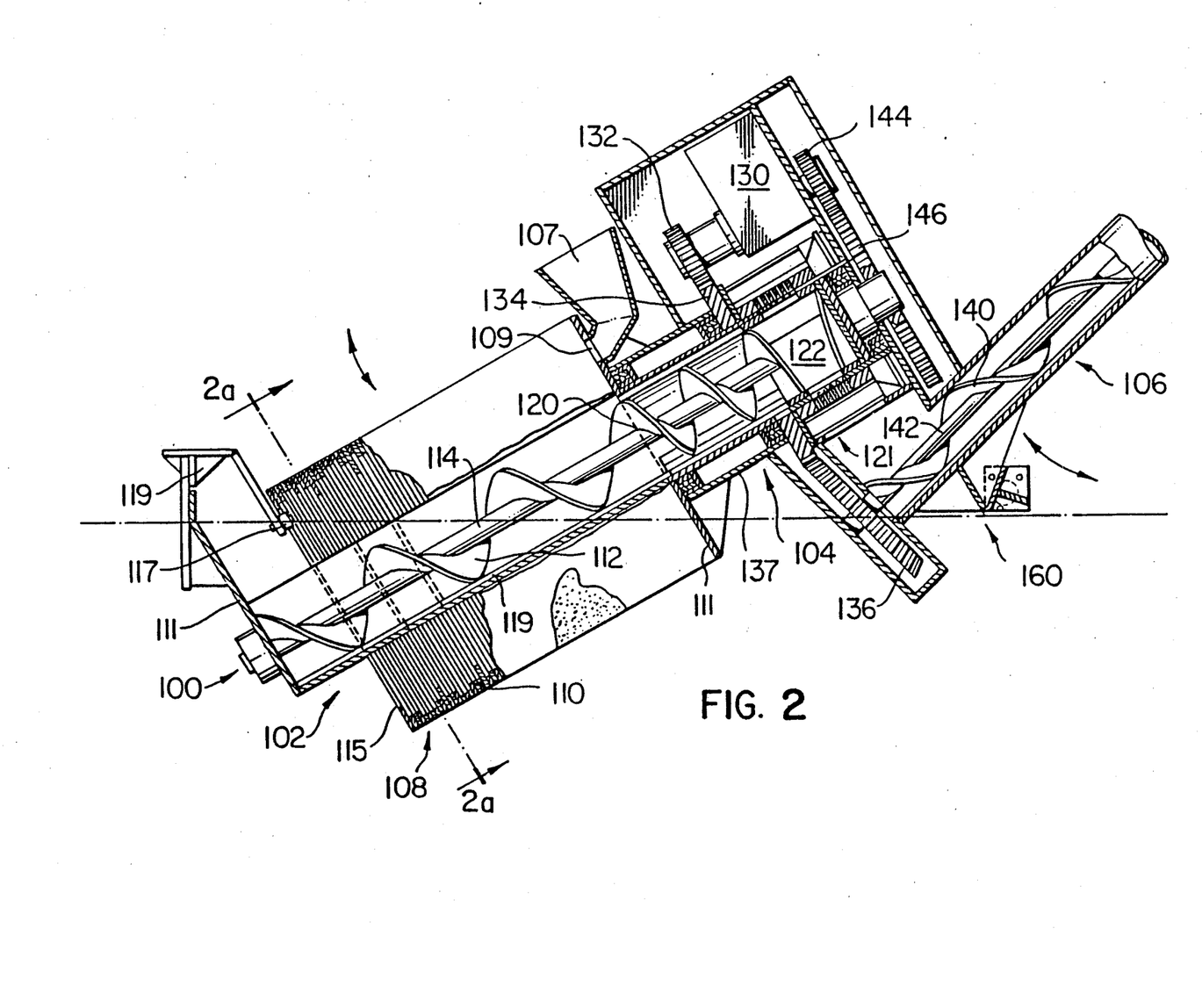
FIG. 2 shows a view in vertical cross-section through a different screening apparatus according to the present invention, in vertical cross section.
Figures 2A, 2H:
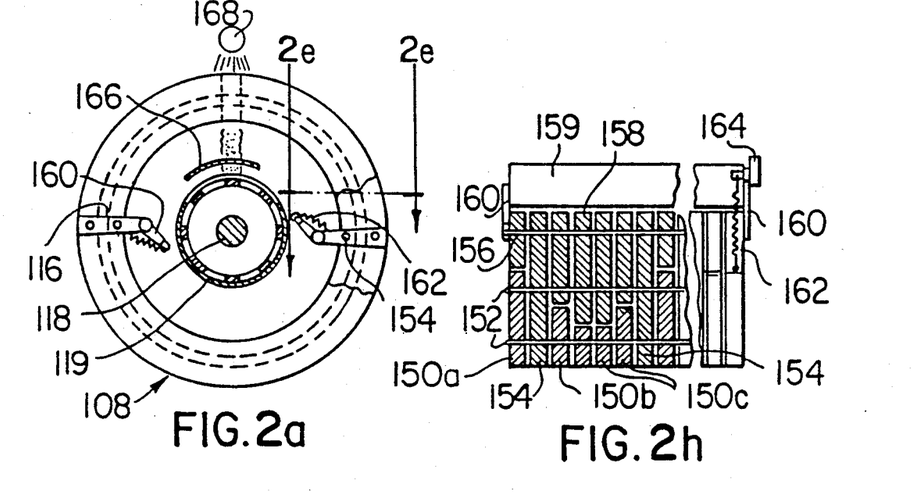
FIG. 2a shows a view taken in transverse cross-section along the line 2a—2a of FIG. 2.

Turning now to FIGS. 2 and 2a of the drawings, which show a second screening apparatus indicated generally by reference numeral 100, it can be seen that the screening apparatus 100 has a separator section indicated generally by reference numeral 102, a compactor section indicated generally by reference numeral 104 and an output conveyor section indicated generally by reference numeral 106.

The separator section 102 has a cylindrical screening basket indicated generally by reference numeral 108, which comprises annular screening bars or rings 110 extending coaxially about a first conveyor auger 112, which has a shaft 114, the lower end of which is carried by a support plate 111.

A stationary hopper 107 is provided at the upper end of the screen 108. The hopper 107 has an outlet communicating with an inlet opening 109 in a circular plate 111, which forms the upper end of the screen 108. Through the hopper 107 and the inlet opening 109, substances may be introduced into the interior of the screen 108 of mixing with and treating the waste material in the screen 108.

The cylindrical screening basket 108 has an open lower end, through which a mixture of liquid and solids can enter in the direction indicated by arrows 115. The lower end of the screening basket 108 is carried on a support roller 117, which is rotatably mounted on a support bracket 119.

The liquids leave the cylindrical basket 108 through the gaps between the bars 110, while the solids are raised by radially inwardly extending arms 116 (FIG. 2a) and dropped into the upwardly-open top of a cylindrically curved trough 118 containing the conveyor auger 112. Bars 119 are interposed between the inner surface of the trough 118 and the periphery of the auger 112 to allow liquid to drain from the solids removed by the auger 112.

These solids are conveyed upwardly by the auger 112 to a compactor auger 120, which forms an extension of the conveyor auger 112.

The material compressed by the compactor auger 120 is discharged into a pelletizer indicated generally by reference numeral 121.

The pelletizer 121 has an eccentric rotor 122 (FIGS. 2b and 2c), which with the compactor auger 120 is mounted on the shaft 114, and which forces the compacted material radially outwardly through openings 124 in a cylindrical wall 126, through outwardly convergent frustoconical openings 123 in a cylindrical wall 125 and through cylindrical extrusion passages 127 in a cylindrical extrusion block 129.

Figure 2B:
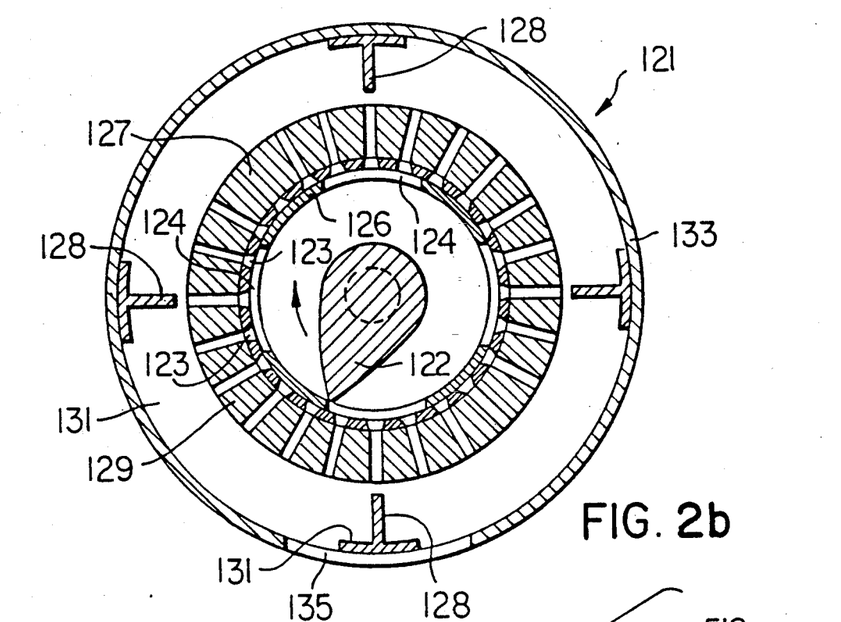
FIG. 2b shows a view taken in transverse cross-section along the line 2b—2b of FIG. 2c.
Figure 2C:
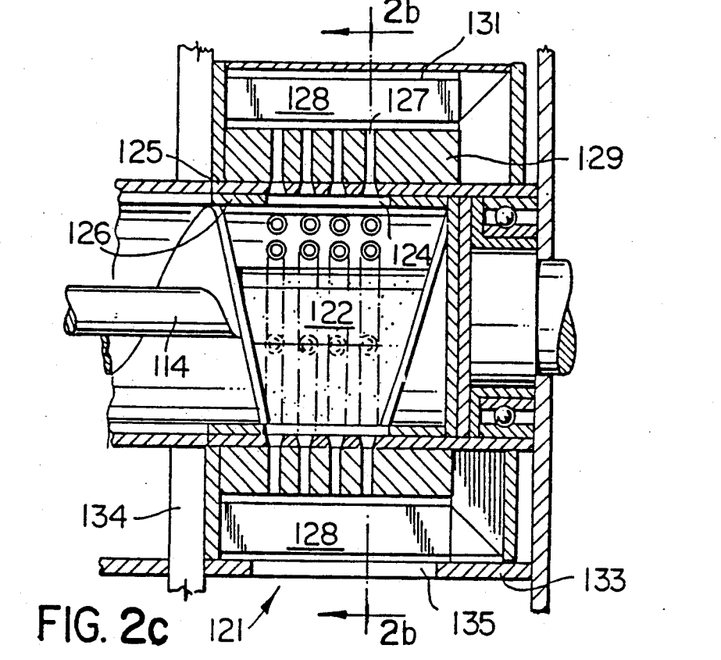
FIG. 2c shows a broken-away view, in longitudinal cross-section, through parts of the apparatus of FIG. 2.

Solid compacted material forced into the pelletizer 121 by the compactor auger 112 is pressed radially outwardly by the eccentric rotor 122 through the openings 123 and is thus extruded as rods from the extrusion passages 127.

Plates 128 rotating about the exterior of the cylindrical extrusion block 129 and within a cylindrical housing 133 break the rods of extruded, compacted solid materials which exit the openings 124, and the broken pieces of rod fall downwardly through an outlet opening 135 in the housing 133 and into the lower, inlet end of the output conveyor section 106. The radial plates 128 extend from plates 131 at right angles to the plates 128, so that plates 128 and 131 together form spaced T-shaped members.

An electric drive motor 130, through an output gear 132 on the shaft of the motor 130, and through a ring gear 134 coaxial with the shaft 114, rotates a gear 136. The ring gear 134 also rotates the plates 128 and 131 and, through a cylindrical housing 137 rotates the screening basket 108.

The output conveyor section 106 has an output auger 140 having a shaft 142, which is connected to and driven by the gear 136. The shaft 142 extends through only the first two turns of the auger 140, the remainder of which has no shaft.

The drive motor 130 has a second output gear 144, which meshes with and drives a gear 146.

The gear 146, in turn, drives the shaft 114 and, therewith, the pelletizer rotor 122, the first conveyor auger 112 and the compactor auger 120 in a direction opposite to the direction of rotation of the screening basket 108.

As can be seen from FIG. 2, the inclination of the axis of the shaft 114 is such as to substantially optimize the screening area of the cylindrical screening basket 108, which is immersed in the mixture of liquid and solids to be separated.

The angle of inclination of the shaft 142 of the second conveyor auger 140 of the output conveyor 106, however, is disposed at a substantially steeper angle of inclination.

Figure 2D:
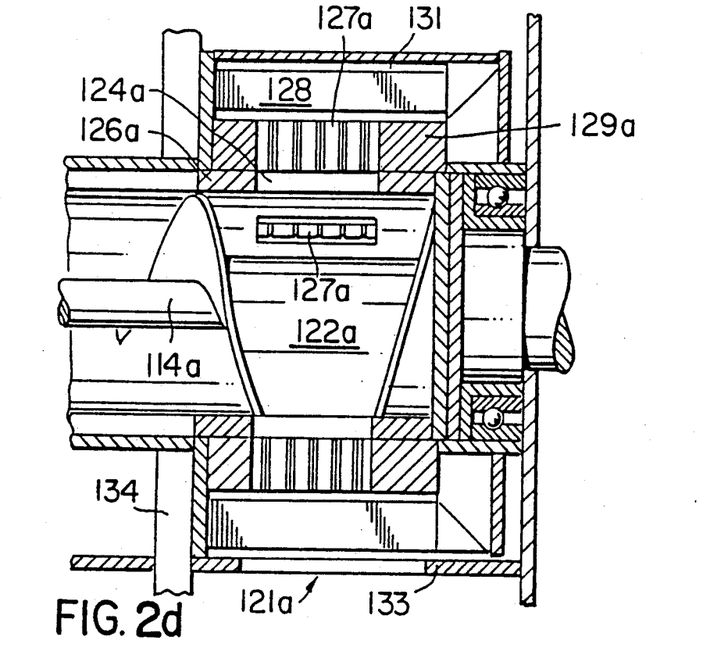
FIG. 2d shows a view corresponding to FIG. 2a, but of a modification of a pelletizer forming part of the apparatus of FIG. 2.
Figure 2E:
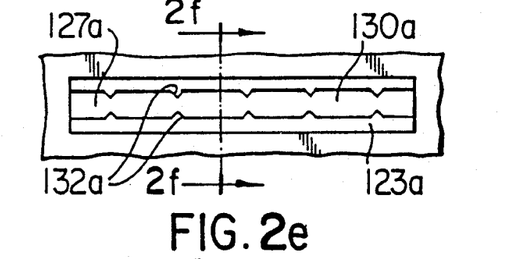
FIG. 2e shows a broken-away view of part of the apparatus shown in FIG. 2d.
Figure 2F:
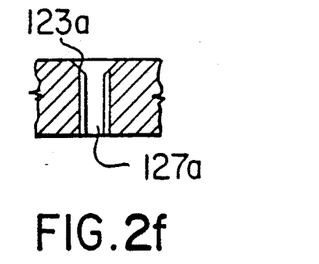
FIG. 2f shows a broken-away view taken in cross-section along the line 2f—2f of FIG. 2e.

FIGS. 2d-f show a modification of the pelletizer 121 of FIGS. 2b and 2c. The pelletizer illustrated in FIGS. 2d-2f is indicated generally by reference numeral 121a and, instead of the cylindrical walls 125 and 126 and the extrusion block 129 of FIGS. 2b, has a cylindrical wall 126a formed with outlet slots 124a and a cylindrical extrusion block 129a at the exterior of the wall 126a. The extrusion block 129a is formed with extrusion slots 127a having outwardly convergent inner portions 123a (FIG. 2f). The remainder of each slot 127a is defined by a pair of parallel, generally flat surfaces 130a, which are interrupted by opposed pairs of radial ribs 132a.

Figures 2G, 2I:
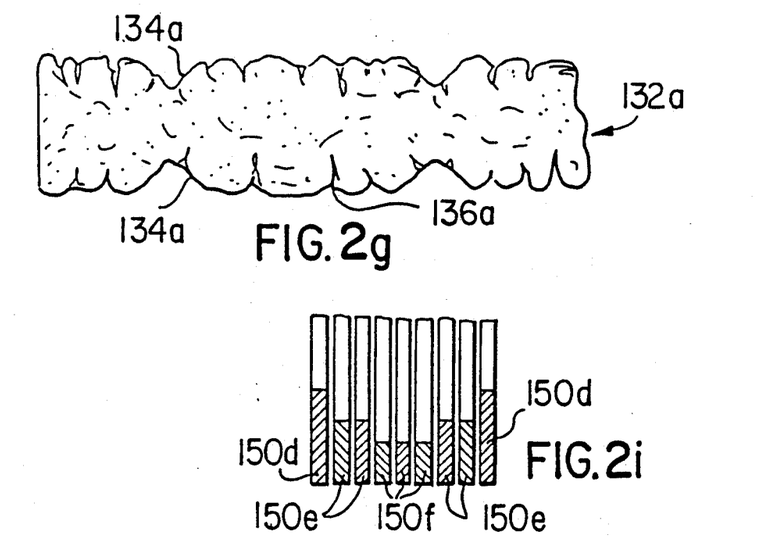
FIG. 2g shows a broken-away view in end elevation, of an extrusion formed by the apparatus of FIGS. 2d–2f.

FIGS. 2g shows a broken-away end view of a piece of solid material extruded from one of the slots 127a and indicated generally by reference numeral 132a. The solid material piece 132a has V-shaped indentations 134a which extend longitudinally thereof and are formed by the ribs 132a, and also fissures 136a, which are formed on expansion of the solid material as it leaves the slot 124a. The indentations 134a and the fissures 136a serve to enable moisture to penetrate into the interior of the extended solid material in order to soften the material and to promote biological action when the material is used for compost.

Referring now to FIGS. 2h which shows in greater detail components of the basket 108, it will be seen that the basket 108 is formed by rings 150a, 150b and 150c, which are connected together by rods 152 to form the cylindrical basket 108. The rings 150a, 150b and 150c are each formed by flat metal annuler, the rings 150a having the greatest radial dimensions, the rings 150c having the least radial dimensions and the rings 150b having radial dimensions intermediate those of the rings 150a and 150c.

Arms 154 are interposed between the rings 150a and 150b. The arms 154 serve as spacers and project radially inwardly, beyond the rings, where they are connected together by a further metal rod 156. Spacers 158, located radially inwardly of the rings 150a, 150b and 150c, are interposed between the arms 154 and are likewise secured by the rod 156.

At the radially innermost ends of the arms 154, a longitudinally extending strip-shaped member 159 is mounted at opposite ends thereof on a pair of arms 160 which, in turn, are pivotally mounted on the rod 156 for pivotation about the axis of the latter under the action of a spring 162 interconnecting the strip-shaped member 159 and one of the arms 154. The spring 162 is a tension spring and, thus, biases the strip-shaped member 159 for pivotation in a clockwise direction, as viewed in FIG. 2a, about the rod 156.

One of the arms 160 carries a roller 164 which, as the basket 108 rotates, rolls against a fixed guide plate 166 located at the upper end of the basket 108. This guide plate 166 deflects the roller 164 radially inwardly, thus deflecting the strip-shaped member 159 so as to align it with the lengths of the arms 154. In this way, solid material picked up by the arms 154 and the strip-shaped member 159, as the latter travels through the lowermost portions of its path of travel on rotation of the basket 108, is deposited onto the auger 112. The dropping of this solid material from the strip-shaped member 159 and the associated arms 154 into the auger 112 is facilitated by an overhead spray 168.

FIG. 2i shows a modification of the basket which in this case comprises single radially wide rings 150d separated by pairs of rings 150e of intermediate radial width, which in turn are separated by three narrow rings 150f.

When it is required to clean or service the apparatus shown in FIG. 2, the entire apparatus may be pivoted upwardly, in a clockwise direction as viewed in FIG. 2, about a pivotal support indicated generally by reference numeral 160.

Figure 3:
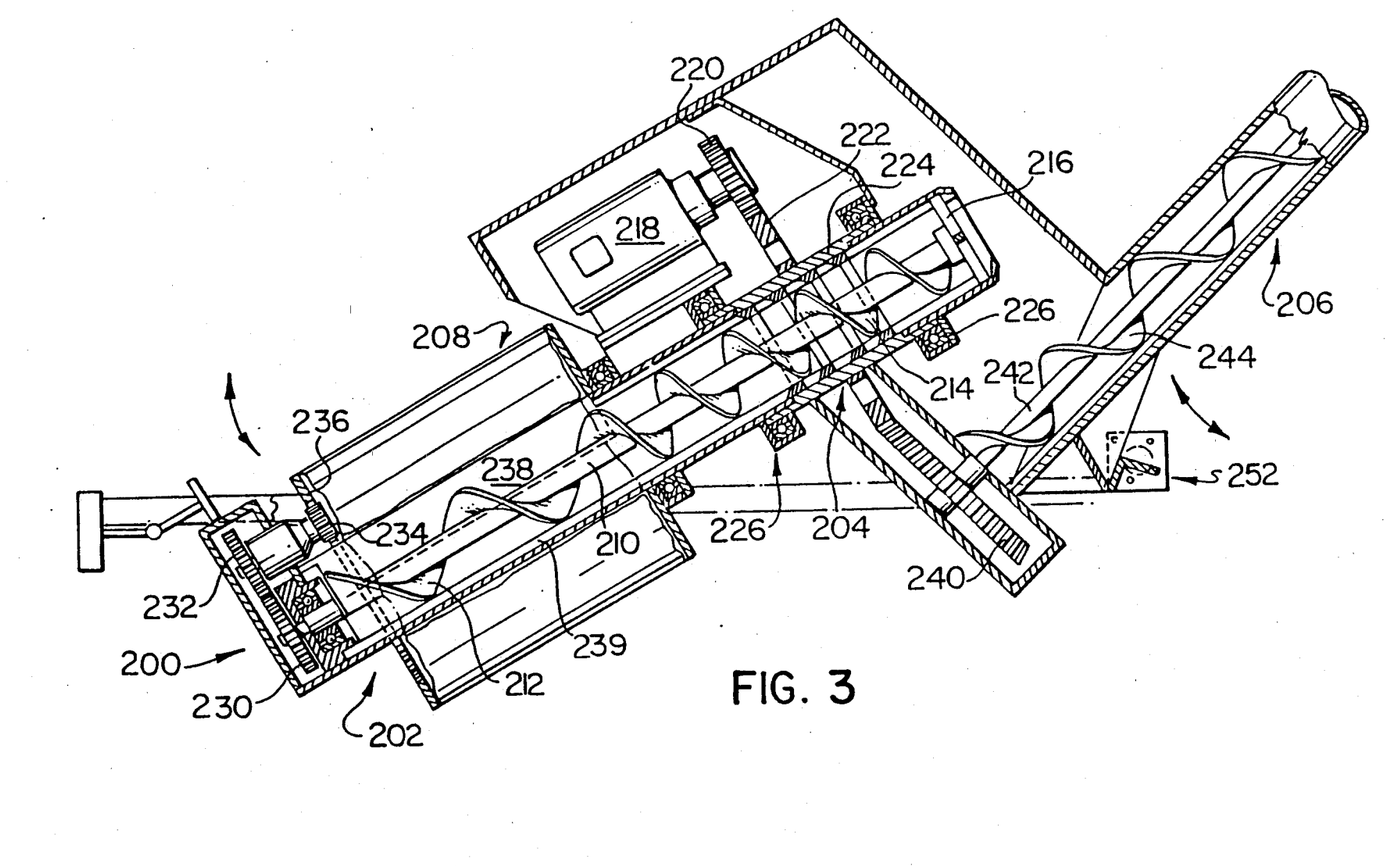
FIG. 3 shows a view in vertical cross-section through a screening apparatus according to a third embodiment of the present invention.

FIG. 3 shows a separator apparatus indicated generally by reference numeral 200, which has a separator section indicated generally by reference numeral 202, a compactor section indicated generally by reference numeral 204 and an output conveyor section indicated generally by reference numeral 206.

The separator section 202 has a cylindrical separator basket, indicated generally by reference numeral 208, which is similar to the separator basket 108 of FIG. 2 and which, therefore, will not be described in further detail. A shaft 210 is provided with a first conveyor auger 212, within the separator section 202 and a compactor auger 214, which forms an extension of the first conveyor auger 212. A cutting device 216 which is similar to the cutting device 28 of FIG. 1, is fixed to the compactor auger 214 at the upper, outer end thereof for slicing the compacted solids into pieces which drop into the second conveyor 244.

An electric drive motor 218 has an output gear 220 which meshes with an d rotates a ring gear 222.

The ring gear 222 is fixedly connected to a sleeve 224, which is rotatably mounted in bearings 226.

Figure 3A:
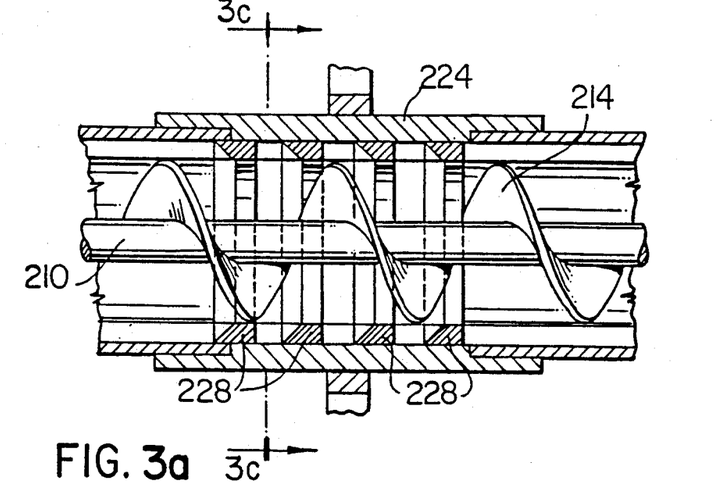
FIG. 3a shows a broken-away view taken in longitudinal cross-section through parts of FIG. 3.

Four annular members 228 (FIG. 3A) are provided within the sleeve 224 and are fixedly connected by welding to the latter and, also, to the outer periphery of the compactor auger 214 for imparting drive to the latter and, thus, to the shaft 210 and the first conveyor auger 212.

Through meshing gears 230 and 232, and through a pinion 234 which meshes with an internally toothed ring gear 236 at the lower, input end of the screenings basket 208, the latter is rotated about an upwardly open trough 238 containing the first conveyor auger 212. In this way, the solid material picked up by the rotating screening basket is deposited into the first conveyor auger 212 in the same manner as that described above in connection with the embodiment of FIG. 2. Longitudinal metal strips 239 are spaced around the auger 212 and 214.

The ring gear 222 meshes with a further gear 240 on the lower end of a shaft 242 of a second conveyor auger 244, within the output conveyor section 206, for rotating the second conveyor auger 244 and, thus, removing in an upward direction the cut pieces of solid material dropping from the cutting device 216. The slot 242 extends through only the first two turns of the auger 244.

As will be apparent from FIG. 3, the angle of inclination of the second conveyor auger, which in this case is the auger 244, is once again substantially greater than that of the first conveyor auger.

Figure 3B:
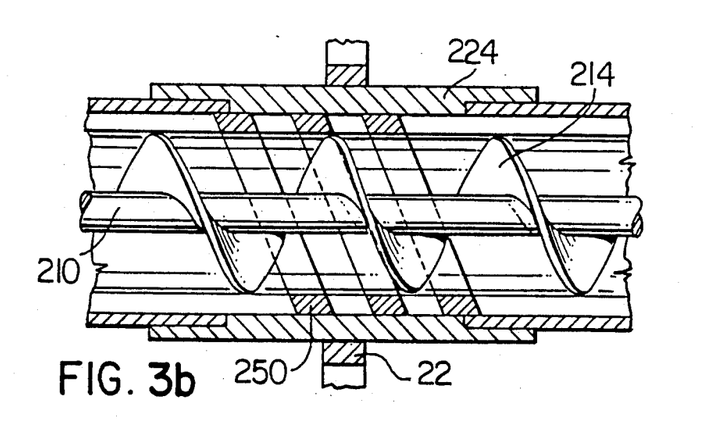
FIG. 3b shows a view corresponding to that of FIG. 3a but of a modified apparatus.
Figure 3C:
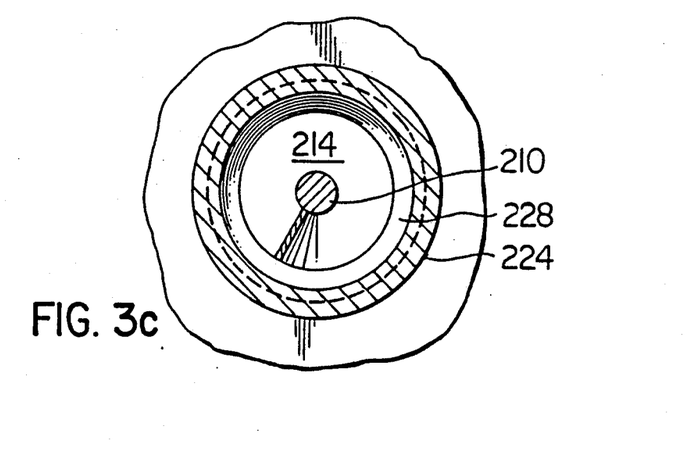

The arrangement shown in FIG. 36 may be modified by replacing the four annular members 228 by a single helical member 250, which is fixed, by welding, to the periphery of the auger 214 and to the inner surface of the sleeve 224.

The entire apparatus of FIG. 3 can be pivoted upwardly in a clockwise direction as viewed in FIG. 3, about a support pivot indicated generally by reference numeral 252, for cleaning and/or servicing of the apparatus.

Figure 4:
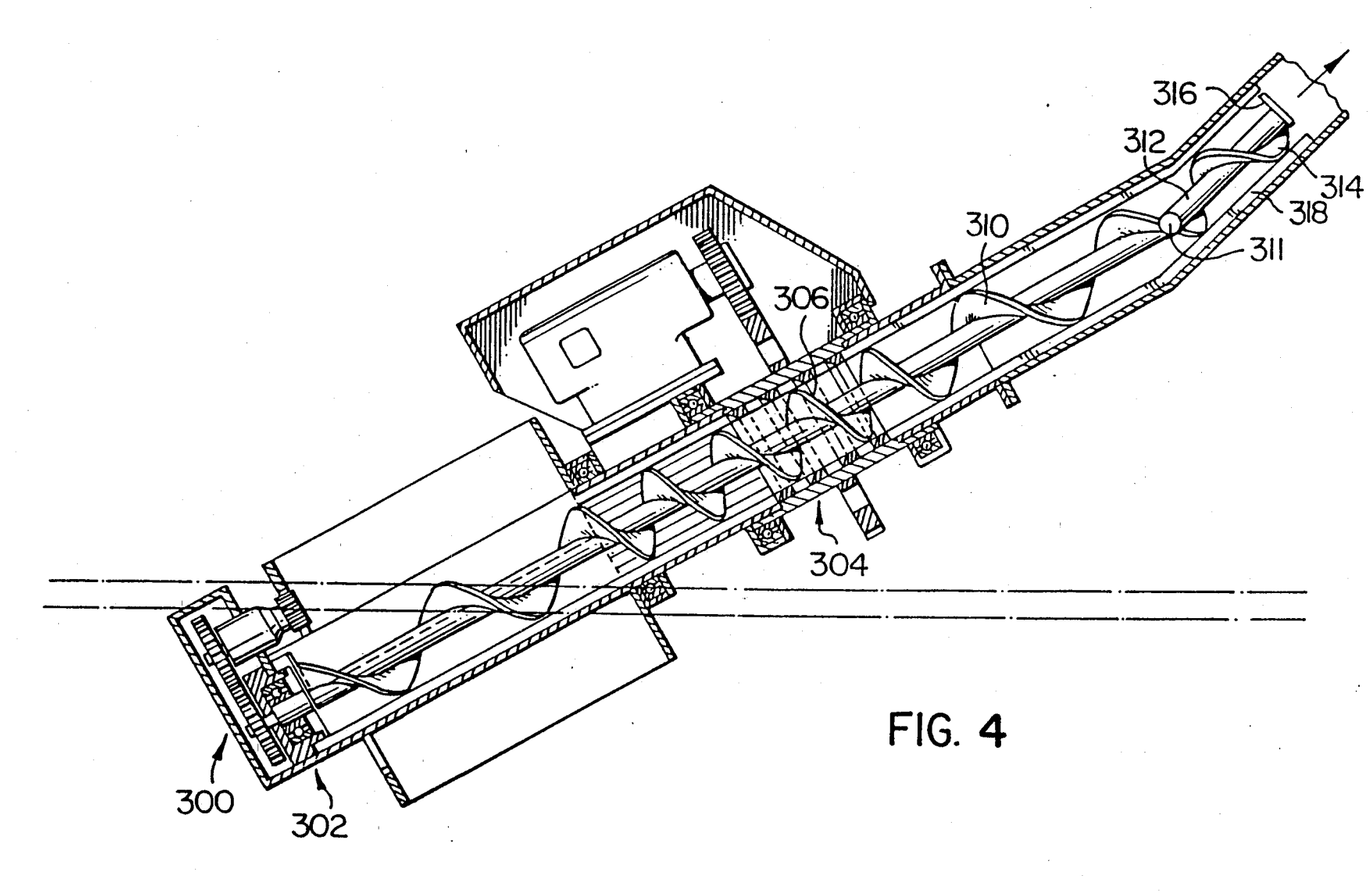
FIG. 4 shows a modification of the screening apparatus of FIG. 3.

FIG. 4 shows a further separator device indicated generally by reference numeral 300.

The separator device 300 has a separator section 302 and a compactor section 304, which are similar to the separator section 202 and the compactor section 204 of FIG. 3 and which, therefore, are not described in further detail.

In this embodiment, however, the output of the compactor is not provided with a cutting device for cutting the compacted solid material, nor a pelletizer device such as that of FIG. 2 for pelletizing the solid material.

Instead, the compactor auger, which in this embodiment is indicated by reference numeral 306 and which is mounted on an auger shaft 308, is extended as a conveyor auger 310.

The shaft 308 is connected through a universal joint 311 to a further auger shaft 312, which extends upwardly at an inclination greater than that of the shaft 308 and which is provided with a second or output conveyor auger 314. The auger 314 terminates in a radial plate 316, which serves to retain the solid material which has been forced beyond the plate 316. The solid material is at least partly prevented from rotating by means of a plurality of stationary metal strips 318, which are spaced around the augers 310 and 314.

Figure 5:
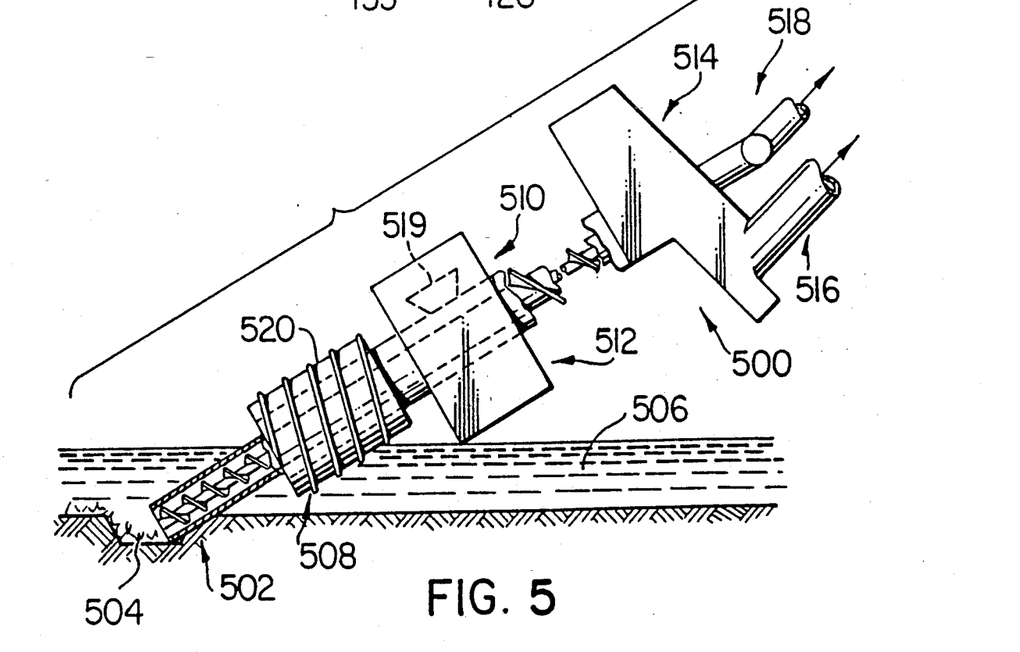
FIG. 5 shows a view in side elevation, partly broken-away in longitudinal cross-section, of a further screening apparatus according to the present invention.

FIG. 5 shows a separator apparatus which is designed to separate solid materials floating in a liquid in a channel and, in addition, to pick up settlings, i.e. sediment such as sand, mud and sludge, and other objects such as stones and gravel from the bottom of the channel.

The apparatus shown in FIG. 5 is indicated generally by reference numeral 500, and has at its lower end an auger indicated generally by reference numeral 502 for removing the settlings from a recess 504 formed in the bottom of a channel containing a liquid 506, in which waste material floats.

The apparatus 500 also has a cylindrical screen indicated generally by reference numeral 508, an outer auger indicated generally by reference numeral 510, which is coaxial with and extends around the auger 502, an inlet indicated generally by reference numeral 512, a compactor and pelletizer unit indicated generally by reference numeral 514 and two outlet conveyors indicated generally by reference numerals 516 and 518. The inlet 512 has a funnel 519 through which substances may be introduced into the outer auger 510 for conditioning the solids conveyed by the latter.

The screen 508 is constructed similarly to the screen 108 of FIG. 2 and, therefore, will not be described in greater detail. However, the screen 508 is provided with a heater element 520, which is wound in a helical fashion around the periphery of the cylindrical screen 508 and serves to heat the latter and the waste material within the screen 508.

The mixture of liquid and floating solid material travelling along the channel 506 enters the lower end of the screen 508, in the manner described above, and the solid material is then removed from the liquid and deposited into the outer auger 510, which extends through the screen 508 and upwardly therefrom to the compactor and pelletizer unit 514.

At the opening 512, additional substances can, if required, be added to the solid material being conveyed upwardly by the outer conveyor 510, for the purpose of treating the solid material before it is compacted.

The inner conveyor 502 extends through the compactor and pelletizer unit 514 and is connected, through a universal joint (not shown) in a manner similar to that described above with reference to FIG. 4, to an outlet auger (not shown) in the outlet conveyor 518.

The compactor and pelletizer unit 514 is similar to that shown in FIG. 2 and, therefore, will not be described in greater detail.

The outlet conveyor 516, which corresponds to the conveyor 106 of FIG. 2, serves to convey upwardly the pellets produced by the compacting and pelletizing unit 514.

The outlet conveyor 516 and 518 have an inclination substantially greater than the inclination of the inner and outer augers 502 and 510, so as to save space.

FIGS. 6 through 10 show a different type of apparatus for picking up sediment from the bottom of a channel in front of a separator screen. More particularly, in FIG. 6 there is shown a duct, indicated generally by reference numeral 600, which may, for example, be a concrete trough, defining a channel for flow of waste water or sewage 602 in the direction of arrow A.

A separator screen, indicated generally by reference numeral 604, forms part of a separating apparatus such as those described above with reference to FIGS. 1 to 4, and a sediment pick-up mechanism indicated generally by reference numeral 606 is provided upstream from the separator screen 604.

Figure 7:
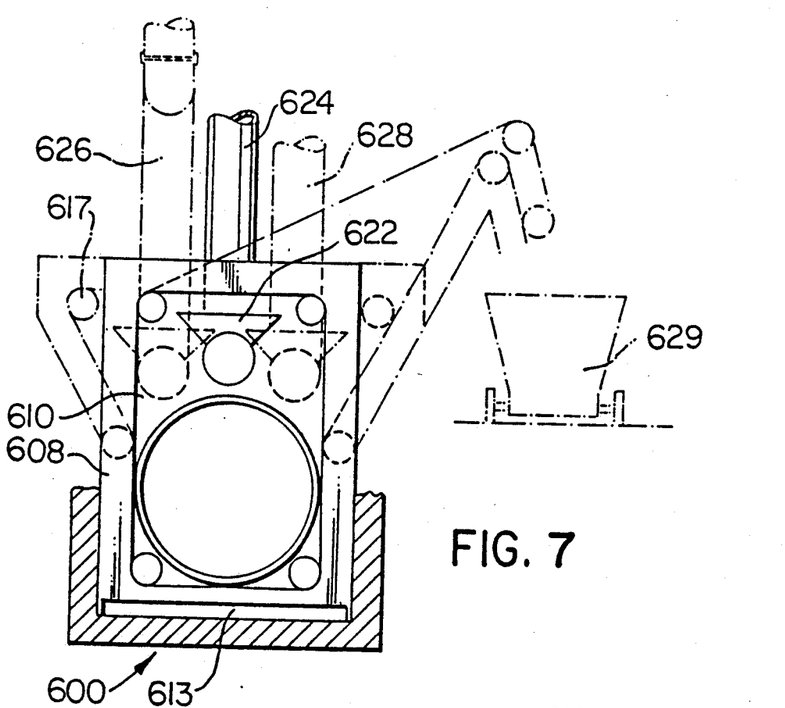
FIG. 7 shows an end view taken in the direction of arrow A of FIG. 6.
Figure 8:
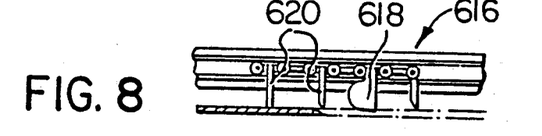
FIG. 8 shows a broken away view in side elevation of a scoop chain forming part of the apparatus of FIGS. 6 and 7.

The sediment pick-up mechanism, as shown in FIG. 7, comprises a rectangular front portion 608, formed with an opening 610 through which the waste water can flow to the screen 604. The front portion 608 is spaced upstream from a rear portion 612, which likewise has an opening (not shown) through which the waste water can flow to the screen 604. The front and rear portions 608 and 612 are formed of sheet metal. The rear portion 612 extends downwardly to the bottom of the channel defined by the duct 600, whereas the bottom of the front portion 608 is formed with a horizontally elongate opening 613, through which sediment, indicated generally by reference numeral 614, can travel along the bottom of the duct 600 into the space between the front and rear portions 608 and 612. A drive chain indicated generally by reference numeral 616 in FIG. 8 is provided for driving scoops, one of which is indicated by reference numeral 618, and plates 620 along the bottom of the duct 600 between the front and rear portion 608 and 612 so as to pick up the sediment, which is then deposited from the scoops 618 through a funnel 622 into an outlet duct 624.

Alternatively, the sediment picked up by the bucket 618 may be deposited into laterally offset outlet ducts, shown in broken lines in FIG. 7 and indicated by reference numerals 626 and 628, or may be carried laterally for discharge into any suitable container, for example a truck 629, also shown in broken lines in FIG. 7.

Figure 9:
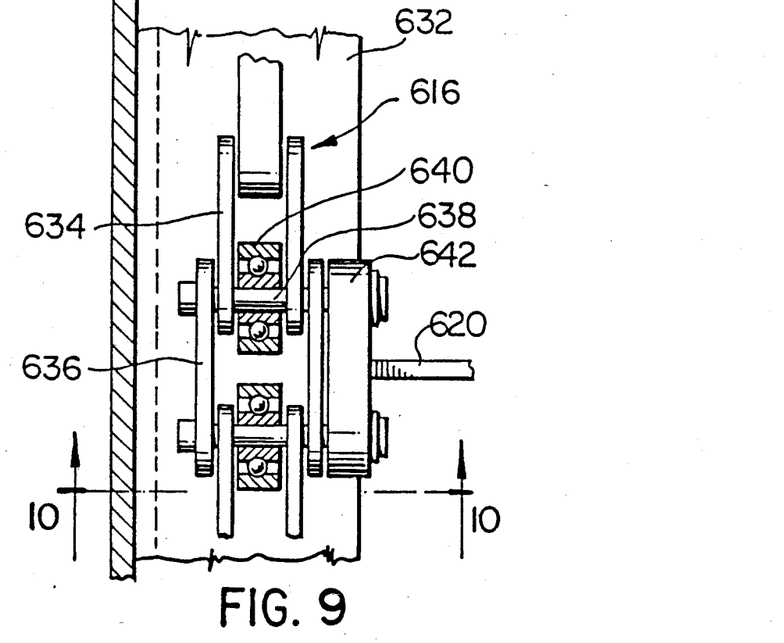
FIG. 9 shows a broken-away view in side elevation, and on a larger scale, of parts of the chain of FIG. 8.
Figure 10:
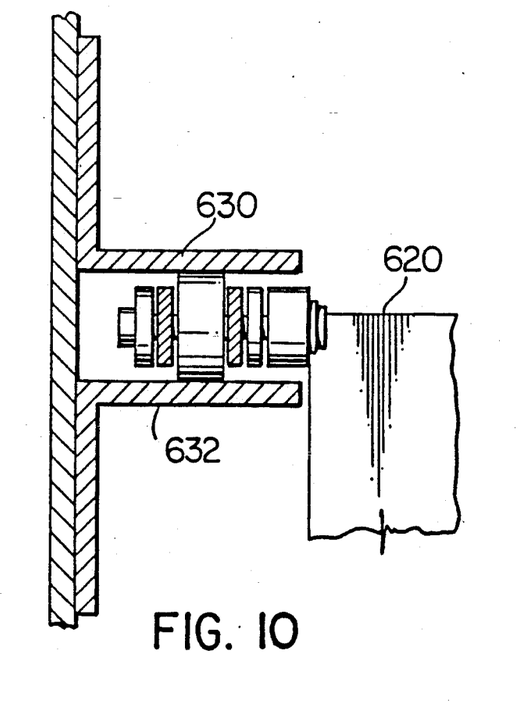
FIG. 10 shows a broken-away view taken in section along the line 10—10 of FIG. 9.

The drive chain 616 is illustrated in greater detail in FIGS. 9 and 10, and travels along a track formed by a pair of L-section metal channels 630 and 632. The drive chain comprises links 634 and 636, connected by pins 638, which extend through ball bearings 640 between the plates 634. The pins 638 project laterally into connecting members 642 which, in turn, carry the plates 620, as shown in FIGS. 9 and 10, and the scoops 618.

The cylindrical screens described above and illustrated in FIGS. 1 to 6 of the drawings are formed by a plurality of ring-shaped or annular members.

Figure 11:
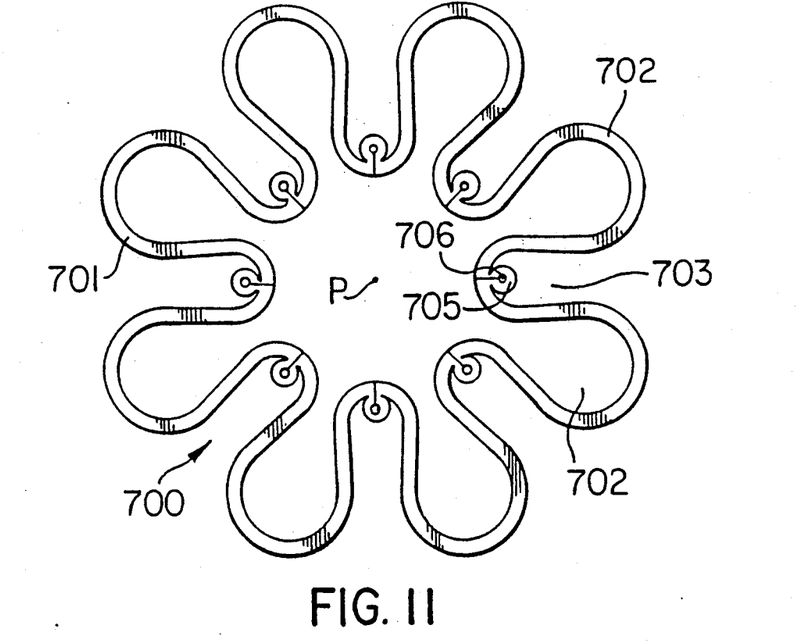
FIG. 11 shows a view in elevation of a screening element for use in a modified separator screen basket.
Figure 12:
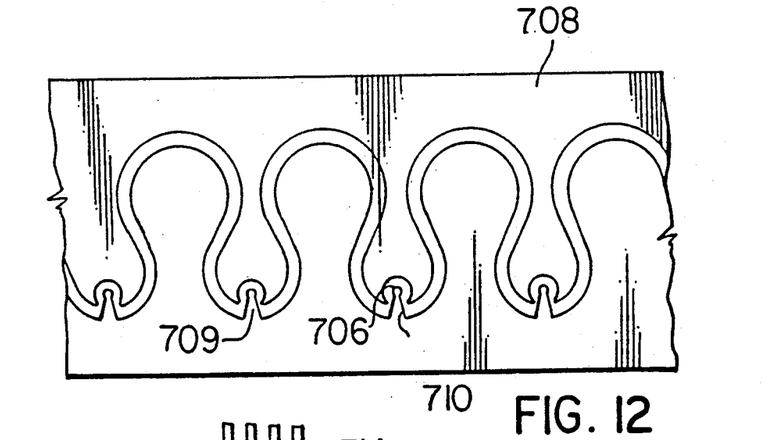
FIG. 12 shows a part of the screening element being cut from a metal strip.
Figure 13:
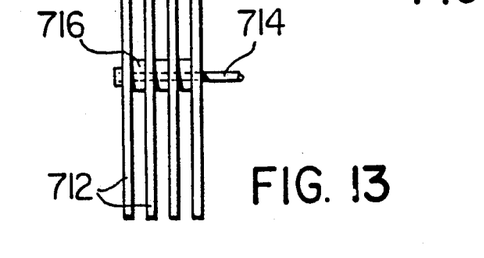
FIG. 13 shows a broken-away view in side elevation of a separator screen incorporating screen elements such as that of FIG. 11.

Referring now to FIGS. 11 through 13, reference numeral 700 indicates generally a screen element which may advantageously be employed instead of the annular screen bars of the separator sections of FIGS. 1 through 5.

The screen element 700 comprises a metal strip 701 which is formed in a meander or serpentine shape having a plurality of radially inwardly open concavities or loop-shaped formations 702 alternating with radially outwardly open concavities or loop-shaped formations 703.

Annular radially outwardly extending projections 705 in the interiors of the formations 703 define circular openings 706, the projections 705 being formed in one piece with the strip 701.

As illustrated in FIG. 12, the screen element 700 is cut in one piece from a metal strip 708, with slots 709 having convergent opposite sides 710 extending into the openings 706 from the opposite sides of the strip 701.

After the strip 701 has cut from the strip 710, the opposite ends of the strip 701 are drawn together and welded together to form the endless screen element 700 extending symmetrically about a central point P as shown in FIG. 11. This deformation of the strip 701 causes the opposite sides 710 of the slots 709 to be drawn together into abutment with one another, thus closing the slots 709.

A plurality of such screen elements, indicated by reference numerals 712 in FIG. 13, are then secured together by connecting or securing rods, one of which is shown in FIG. 13 and indicated by reference numeral 714, to form a separating screen. Spacers 716 are provided on the securing rods for maintaining drainage gaps or spacings between the separating elements 712.

By forming the separating elements in the endless meander or serpentine shape shown in FIG. 11, the separator screen or section is provide with an internal peripheral length which is much greater than that of a separating screen having substantially the same diameter but formed of annular screen elements or bars.

Thus, the separator screen formed by the screen elements 712 has a substantially larger effective area than a cylindrical screen of the same diameter, resulting in a substantially more efficient utilization of space.

Figure 6:
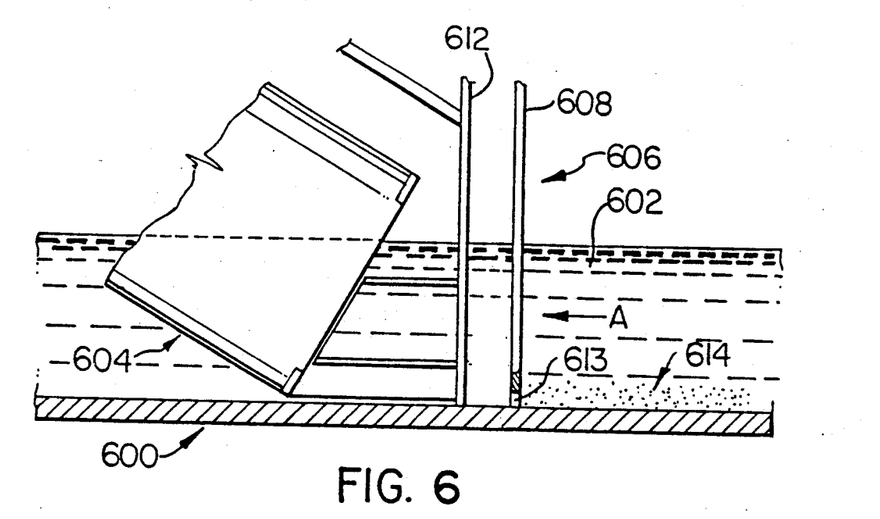
FIG. 6 shows a broken-away view in side elevation of a still further screening apparatus according to the present invention.
Figure 14:
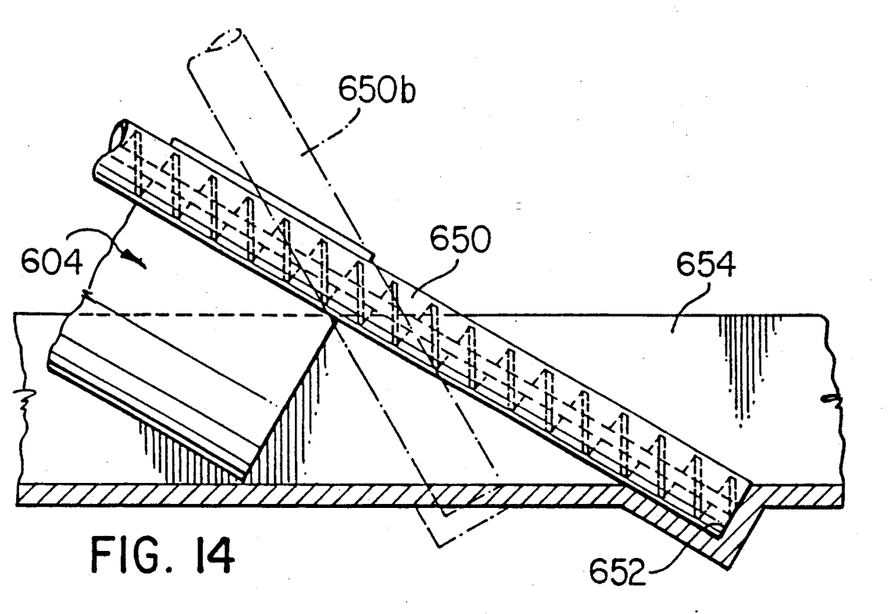
FIG. 14 shows a side view of a further screening apparatus.
Figure 15:
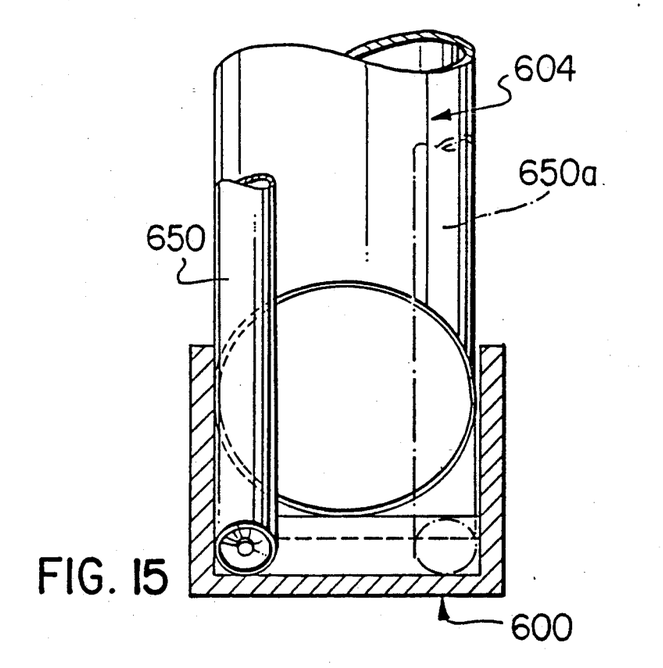
FIG. 15 shows an end view of the screening apparatus of FIG. 14.

FIGS. 14 and 15 show a modification of the apparatus of FIG. 6, in which the sediment pick-up mechanism 606 of FIG. 6 has been omitted and has been replaced by an auger 650 for removing sediment, for example sand, from the bottom of the duct 600. The auger 650 extends forwardly, i.e. upstream, of the separator screen 604.

In this case, the bottom of the duct 600 is formed with a recess 652 for receiving a lower end 654 of the auger 650.

The inclination of the auger 650 is such that the axes of the auger 650 and the cylindrical separator screen 604 are parallel to one another, the auger 650 being almost level with the top of the separator screen 604 and extending between the separator screen 604 and a side wall 654 of the concrete duct 600.

The auger 650, as viewed in FIG. 15, is located at the lefthand side of the separator screen 604, but may alternatively be provided at the opposite side of the separator screen 604, as shown in broken lines in FIG. 15 and indicated by reference numeral 650a.

The auger 650a is also parallel to the axis of the separator screen 604.

Furthermore, the auger 650 and 650a may be replaced by a different auger, which is shown in broken lines in FIG. 14 and indicated by reference numeral 650b, and which has a substantially steeper inclination than the augers 650 and 650a.

I claim:

1. Apparatus for separating solids and liquids, comprising:
   separator screen means for receiving and separating the solids and liquids;
   said separator means comprising a curved screen;
   first conveyor means for feeding the separated solids upwardly from said separator screen means extending at a first inclination through said separator screen means;

compactor means for receiving the solids from said conveyor means and compacting the solids;

cutter means for cutting the compacted solids into pieces;

and wherein a second conveyor means for receiving and conveying the cut pieces from said compactor means extends further upwardly and at a greater inclination than said first conveyor means.

2. Apparatus as claimed in claim 1, wherein said cutter means comprise cutter blade means mounted for rotation with said compactor at an outer end of said compactor means for slicing through compacted solid material discharged from said compactor means.

3. Apparatus as claimed in claim 1, wherein said compactor means comprise a compactor auger and said cutter blade mean extend radially of the axis of rotation of said compactor auger.

4. Apparatus as claimed in claim 1, wherein said separator screen means comprise a cylindrical screen formed by a plurality of co-axial ring members; and means for rotating said cylindrical screen, said first conveyor extending co-axially through said cylindrical screen and comprising an auger and means extending around said first conveyor for retaining solid material and said cylindrical screen having means for lifting solid material caught by said screen and depositing the lifted solid material into said first conveyor.

5. Apparatus as claimed in claim 1, wherein said compactor means comprise a compactor auger; a cylindrical member surrounding and co-axial with said compactor auger; means connecting said compactor auger to said cylindrical member and means for rotating said cylindrical member and said compactor auger.

6. Apparatus as claimed in claim 5, wherein said first conveyor comprises a conveyor auger co-axial with and fixed relative to said compactor auger, whereby the rotation of said compactor auger rotates said conveyor auger.

7. Apparatus as claimed in claim 5, wherein said connecting means comprise a plurality of ring members spaced apart from one another along said compactor auger and interposed between and fixedly connected to said compactor auger and said cylindrical housing.

8. Apparatus as claimed in claim 5, wherein said connecting means comprise a helical member extending coaxially around said conveyor auger and interposed between and fixedly connected to said conveyor auger and said cylindrical housing conveyor auger.

9. Apparatus as claimed in claim 1, wherein said first conveyor, said compactor means and said second conveyor comprise respective augers arranged in succession, and further comprising universal joint means connecting said compactor means auger to said second conveyor auger.

10. Apparatus as claimed in claim 1, wherein said first conveyor comprises a pair of conveyor augers, the other of said pair comprising means for conveying settlings from the bottom of a channel served by said apparatus.

11. Apparatus as claimed in claim 1, further comprising means for heating said separator screen means.

12. Apparatus as claimed in claim 1, further comprising means for adding substances to the solids conveyed by said first conveyor.

13. Apparatus as claimed in claim 1, further comprising sediment conveyor means for removing sediment from a location upstream of said separator screen means, said sediment conveyor means comprising an endless drive chain; means for driving said endless drive chain around an endless path; means on said drive chain for scooping up sediment and means for receiving sediment discharged thereto by said scooping means.

14. Apparatus for separating solids and liquids, comprising:

separator screen means for separating the solids and liquids;

said separator means comprising a curved screen;

conveyor means for feeding the separated solids upwardly from said separator screen means extending at a first inclination through said separator screen means;

compactor means receiving the solids from said conveyor and compacting the solids;

pelletizer means for converting the compacted solids into pellets; and wherein a second conveyor means for receiving and conveying the pellets extends further upwardly and at a greater inclination than said first conveyor means.

15. Apparatus as claimed in claim 14, wherein said pelletizer means comprises a cylindrical housing, an eccentric rotor within said cylindrical housing; means for rotating said rotor within said cylindrical housing; means defining outlets openings for the exterior of the compacted solids from said cylindrical housing by the rotation of said rotor and means at the extrusion of said cylindrical housing for breaking into pieces the compacted solids extruded through said outlet openings.

16. Apparatus as claimed in claim 15, wherein said outlet openings are cylindrical.

17. Apparatus as claimed in claim 13, wherein said outlet openings are slot-shaped and provided with projection means extending into said outlet openings for forming indentations in the compacted solids extruded through said outlet openings.

* * * * *